(No Model.)

R. N. ALLEN.
GEAR PINION OR WHEEL.

No. 429,108. Patented June 3, 1890.

Witnesses:
Robt. F. Gaylord
Robt. H. Duncan

Inventor
Richard N. Allen

UNITED STATES PATENT OFFICE.

RICHARD N. ALLEN, OF CLEVELAND, OHIO.

GEAR PINION OR WHEEL.

SPECIFICATION forming part of Letters Patent No. 429,108, dated June 3, 1890.

Application filed January 30, 1890. Serial No. 338,583. (No model.)

*To all whom it may concern:*

Be it known that I, RICHARD N. ALLEN, a citizen of the United States, residing at Cleveland, in the county of Cuyahoga and State of Ohio, have invented a new and useful Improvement in Gear Pinions or Wheels and in Methods of Making the same, of which the following is a specification.

The present invention relates to pinions or small wheels provided with teeth, such as are commonly used upon machines of various kinds. Such pinions or wheels, when constructed wholly of metal suitable to form the teeth thereof, produce when in operation a ringing or buzzing noise, which has been the cause of great discomfort and annoyance. This is more noticeable in pinions and small wheels than in larger ones, owing to the fact that they are generally driven at a much higher rate of speed. Many attempts have been made to overcome this defect in the construction of such parts by making the pinions mainly of rawhide or other soft material, and sometimes of alternate layers of rawhide and metal bolted together. These constructions, while operating to greatly reduce the noise of the meshing pinions, are objectionable for these reasons: If made wholly from rawhide, the teeth are more or less flexible and soon wear or become misplaced and fail to properly mesh with the teeth of corresponding wheels. If made partly from rawhide and partly from metal, there is an unequal wear upon the teeth of the corresponding gears where they come in contact with each other.

It is the object of the present invention to construct these pinions or wheels partly from metal suitable for the meshing teeth of the wheels and partly of a metal which is comparatively non-sonorous, and will operate to greatly diminish the ring and disagreeable noise resulting from the rapid revolution of such wheels when meshing with each other. To accomplish this, I construct that portion of the wheel on which the teeth are formed of a kind of metal suitable for this purpose—that is, to form teeth which will stand the wear and tear of meshing with corresponding teeth—and I construct the portion of the wheels lying between the rim and the hub of a non-sonorous or non-elastic metal like lead or zinc, or some alloys or other metals equivalent for this purpose, as hereinafter more fully set forth.

My invention is illustrated in the accompanying drawings, in which—

Figure 1:
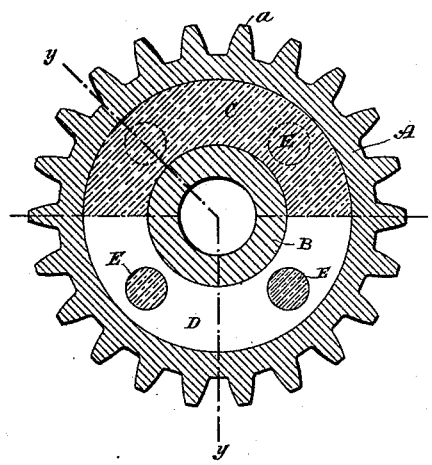
Figure 2:
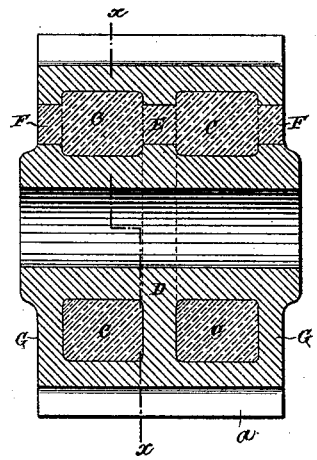
Figure 3:
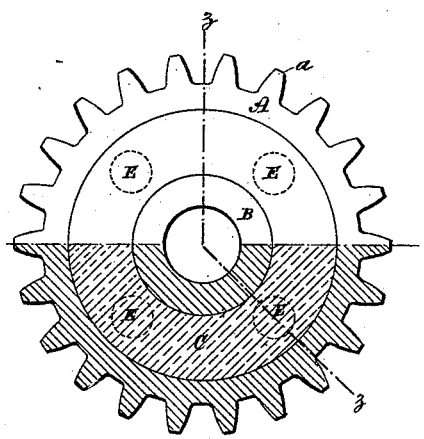
Figure 4:
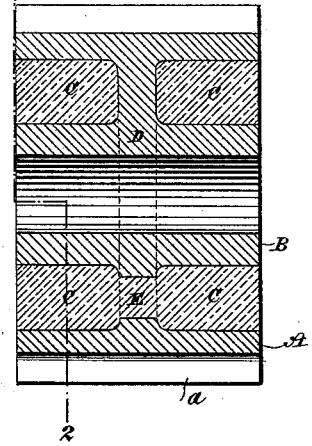

Figure 1 is a cross-section of a geared pinion on the line $x\ x$ of Fig. 2. Fig. 2 is a longitudinal section taken on the line $y\ y$ of Fig. 1. Fig. 3 is a view, partly in cross-section and partly in elevation, taken on the line 1 2 of Fig. 4. Fig. 4 is a longitudinal section taken on the line $z\ z$ of Fig. 3.

In the drawings, A represents the rim of a pinion provided with teeth $a$.

B represents the hub.

C represents chambers or spaces lying between the rim A and the hub B, which are filled with lead or other non-sonorous metal.

D is a central web or rib, preferably made of the same metal as the rim A and hub B.

E represents apertures passing through the central rib or web and connecting contiguous chambers C.

F represents apertures passing through end walls G, and G represents end walls, which are preferably of the same metal as the rim and hub.

The rim and the hub of the pinion may be formed in any way and out of any suitable metal adapted to form the teeth, and they may be joined together by any proper means which will leave suitable spaces or chambers between the rim and the hub for the lead or other equivalent non-sonorous metal, which may be secured in place by any suitable means. I prefer, however, to form the rim and hub and to connect them together by casting them in suitable molds, so as to form a shell or case provided with chambers or spaces between the rim and the hub to receive and hold the lead or other non-sonorous metal.

Figs. 1 and 2 of the drawings illustrate a construction in which such shell is formed by casting from any suitable metal, as phosphor-bronze, brass, steel, or iron, in such way as to form the chambers C C extending around the hub, these chambers being connected together by apertures E, of smaller diameter than the depth of the chambers themselves. The rim and the hub are connected together by casting a central web or rib D and by the two end walls G G, through which are apertures F, leading into the chambers C. A shell or case of this construction can be easily cast by methods well known to foundrymen, and the teeth $a$ may be formed in casting, or the rim A may be cast solid and the teeth $a$ formed afterward by gear-cutters. After the shell is formed, as above described, the lead or other equivalent metal is melted and poured through the apertures F to fill the chambers C and their connecting apertures E until the chambers C and the apertures E and F are filled. As melted lead, as well as most other soft and comparatively non-sonorous metals, contracts on cooling, it is desirable to heat the shell in order to expand it and increase as much as practicable the area of the chambers C and apertures E and F, so that the walls forming such chambers and apertures will contract simultaneously with the melted lead, and thus enable the lead when set to entirely, or as nearly as possible, fill the spaces it occupies. It is observed that the smaller diameter of the apertures E and F as compared with the depth of the chambers C will hold the lead or other metal in place.

The construction shown in Figs. 3 and 4 differs only from the construction described above in that the end walls G are omitted and the chambers C extend out to their full depth to the ends of the pinion. This construction may be made in the same way as above described by casting the shell and leaving spaces or chambers C connected together by apertures E. The central rib D is the same as shown in Figs. 1 and 2. The chambers C in this construction may be filled with lead or other non-sonorous metal in the same manner as above described.

I have found by actual experiment that lead is a metal well adapted for this purpose, that it is comparatively cheap and can be readily and easily put into place in its melted state, and when cooled, especially if the shell is heated and allowed to contract with the heated lead, the lead itself will fill the chambers and be held securely in place. I do not wish, however, to limit my invention to the use of lead, as I am well aware that there are many kinds of metals—like zinc and alloys of zinc and lead and other metals—which will serve the purpose of largely reducing the objectionable noise and ring of the wheels when interposed between the rim and the hub.

What I claim as new is—

1. A gear pinion or wheel provided with spaces or chambers located between the hub and geared rim, and a central strengthening web or rib extending from the hub to the rim provided with apertures connecting contiguous chambers, the said chambers and apertures being filled with lead or equivalent non-sonorous metal, substantially as and for the purpose set forth.

2. A gear pinion or wheel composed of a geared rim and a hub, end walls, and a central web provided with apertures and arranged to form chambers between the rim and the hub, said chambers and apertures being filled with lead or equivalent non-sonorous metal, substantially as and for the purpose set forth.

RICHARD N. ALLEN.

Witnesses:
ROBT. F. GAYLORD,
ROBT. H. DUNCAN.